United States Patent
Mc Greer et al.

(10) Patent No.: US 7,587,138 B2
(45) Date of Patent: Sep. 8, 2009

(54) BROADBAND 2×2 OPTICAL SPLITTER

(75) Inventors: Kenneth Mc Greer, Fremont, CA (US); Anthony J. Ticknor, Cupertino, CA (US); Hao Xu, San Jose, CA (US)

(73) Assignee: NeoPhotonics Corporation, San Jose, CA (US)

( * ) Notice: Subject to any disclaimer, the term of this patent is extended or adjusted under 35 U.S.C. 154(b) by 265 days.

(21) Appl. No.: 11/678,485

(22) Filed: Feb. 23, 2007

(65) Prior Publication Data

US 2007/0217739 A1    Sep. 20, 2007

Related U.S. Application Data

(60) Provisional application No. 60/776,406, filed on Feb. 24, 2006.

(51) Int. Cl.
*H04J 14/02* (2006.01)
*G02B 6/28* (2006.01)
*G02B 6/26* (2006.01)

(52) U.S. Cl. ............... 398/82; 385/24; 385/31

(58) Field of Classification Search ............ None
See application file for complete search history.

(56) References Cited

U.S. PATENT DOCUMENTS

| | | | |
|---|---|---|---|
| 5,044,715 A | 9/1991 | Kawachi et al. | |
| 5,880,874 A | 3/1999 | Shibuya et al. | |
| 6,263,128 B1 * | 7/2001 | Huang | 385/24 |
| 6,606,433 B2 | 8/2003 | Oguma et al. | |
| 7,085,438 B2 | 8/2006 | Mizuno et al. | |
| 2003/0174955 A1 * | 9/2003 | Chen et al. | 385/42 |
| 2005/0058398 A1 * | 3/2005 | Doerr | 385/39 |

OTHER PUBLICATIONS

International Search Report for PCT/US07/62750 dated Mar. 28, 2008.

* cited by examiner

*Primary Examiner*—Michelle R. Connelly-Cushwa
*Assistant Examiner*—Chris Chu
(74) *Attorney, Agent, or Firm*—Turocy & Watson, LLP

(57) ABSTRACT

An optical device containing a four-port optical mixer capable of distributing the optical power presented at either or both of two input ports to specified ratios in two output ports.

29 Claims, 8 Drawing Sheets

BROADBAND 2×2 OPTICAL SPLITTER

CROSS REFERENCE TO RELATED APPLICATIONS

This application claims the benefit of priority from provisional application Ser. No. 60/776,406 filed Feb. 24, 2006, which is hereby incorporated by reference.

TECHNICAL FIELD

The invention provides multi-port optical waveguide elements that distribute the optical power from one or two inputs into two outputs with the power balance ratio being substantially constant over a wide fractional bandwidth of wavelengths.

BACKGROUND

Recent times have seen a tremendous worldwide escalation of activities towards providing more-and-more people with broadband access to the internet and other electronic information sources. Existing telephone and cable-television networks have been 'hot-rodded' to provide a privileged few the ability to retrieve digital information at a few hundred kilobits or a few megabits per second. However it is widely recognized that in order to make an information network that is truly interesting, relevant, and most importantly capable of delivering commercially-viable services, it needs to reach many more consumers with even higher bandwidth. Existing access networks, designed for cable television and wired or wireless telephone service, are not practically suited for reaching these levels. To address the anticipated demands, access providers (typically phone or cable companies) have begun planning and installing new fiber-optic access networks with fiber reaching from the central office to, or very near to, the consumer premises.

By a significant margin, the predominate architecture of these emerging fiber-optic networks is the Passive-Optical-Network, or PON. The term 'passive' here refers to the fact that between the Optical Line Termination (OLT) at the access providers central office (CO), and the Optical Network Unit (ONU), for instance on the side of the customers house, the fiber-optic network has no powered or dynamic components.

In typical usage presently, a PON transports two or three data streams between the CO and the consumer. There is a digital data stream going from the CO to the consumer ('downstream' data), a digital data stream from the consumer back to the CO ('upstream'), and in some cases a hybrid analog/digital downstream carrying multi-channel video (i.e., the cable TV signal). Commonly, each of these streams is transported at a different wavelength so they can be more readily distinguished by the OLTs and ONUs. Typically the downstream (OLT to ONU) data would be transmitted at about 1490 nm (S-Band), the upstream (ONU to OLT) data at about 1310 nm (O-Band), and the video downstream at about 1550 nm (C-Band). There is also ongoing consideration to include additional wavelengths within the domain of about 1250 nm to 1625 nm to further increase the capacity of the network to transport digital streams.

The segments of the PON are invariably shared so that each OLT services several ONUs. The OLT can only service one ONU at a time for each digital stream (downstream digital broadcast is possible, but is not a common operation). The video stream is typically a free-running broadcast from the OLT to all the ONUs. The ONUs are synchronized to signals in the network so that at any given moment no more than one is communicating to the OLT. The downstream data is tagged such that only the ONU for which it is intended will forward the data into the premise network of that customer. Sharing is accomplished by splitting the fiber network into several branches within the PON using optical splitters, which passively divide the optical power evenly among all the downstream branches of that segment. Upstream signals passing through the splitter are reduced in power by the balance ratio, but are only carried upstream to the OLT and do not return downstream to the other ONUs.

Optical splitters for PONs typically service a modest number N of branches (i.e. 32) and may have one input (a 1×N splitter) or two inputs (a 2×N splitter). The 2×N variety of splitter is used when it is desired to combine the function of the splitter and a wavelength-agnostic service multiplexer (i.e. to combine digital downstream and video without regard for their individual wavelengths), or to simply accommodate the possibility of adding another service in the future.

The greatest expense in installing a new fiber-optic access network is the 'trenching' cost, or getting the transport components (chiefly fiber and splitters) installed from point-A (i.e., OLT) to all points-B (i.e., ONUs). As such, there is strong motivation to assure that the installed transport network is as adaptable as possible, and that it can be used for as-yet unspecified future network needs. The capacity of the fiber-optic network itself is much greater than is utilized by present schemes, and as long as it is kept adequately generic, it can be used for future higher-bandwidth schemes without needing to entrench a new network. Here the qualification 'adequately generic' primarily means transmission behavior is independent of wavelength over a range from 1.25µ (1250 nm) to 1.65µ (1650 nm). This means that it is highly desired that the fiber and other optical components between the OLT and the ONU's be wavelength insensitive over about 30% fractional bandwidth. Herein, for convenience but not based on any established convention, this is referred to as the 'ultra-broad' wavelength range.

For 1×N and 2×N splitters where N is 8, 16, 32, 64, or 128, the preferred splitter technology is Planar Lightwave Circuits. For N equal 2 or 4, fused biconic fiber splitters may also be competitive, depending on cost/performance requirements. For N not a power of two or larger than 128, splitter technologies have not been well investigated, so such values of N are not called for.

A Planar Lightwave Circuit, or interchangeably Printed Lightwave Circuit, (PLC) is an optical waveguide system fabricated on the surface of a substrate, commonly by means that can be closely compared to the replication processes used in manufacturing integrated electronic circuits. Even as PLCs become increasingly complex and sophisticated they remain, just as in electronic integrated circuits, primarily composed from a handful of basic circuit elements. One of the fundamental waveguide circuit elements is the four-port mixer. Each of the ports of such a device can fundamentally be used for optical signals either directed into or extracted out of the mixer, or even in both directions simultaneously, with various resultant behaviors. However, the four-port optical mixer is almost invariably characterized as a device with two 'input' ports and two 'output' ports with the implicit knowledge that the other modes of behavior can be derived from this specification. When the behavior of the four-port mixer is specified in this manner, it is commonly called a 2×2 coupler or a 2×2 splitter. When each of the coupler 'outputs' are connected to the input port of a 1×(N/2) splitter circuit element, the composite circuit provides the function of a 2×N splitter.

1×N splitters, where N is a power of two, can be made by cascading 1×2 splitters or 2×2 splitters. Three-port 1×2 splitters that provide sufficiently uniform division of power over the ultra-broad wavelength range are known in the art, and can be manufactured in a variety of non-trivial, but well demonstrated methods. The first stage of a 2×N splitter must be a four-port 2×2 device. Therefore, to have the capability to produce a wavelength-insensitive 2×2 splitter it is necessary, and generally sufficient to provide the capability to produce a wavelength-insensitive 2×N splitter.

In a 2×2 optical splitter, light entering into either of two input ports emerges from two output ports. Herein, input and output are terms used to identify particular ports and are not meant to imply a particular direction for the propagation of light. For example, in a 2×2 optical splitter, light may enter an output port and emerge from the input ports. Alternatively, light may enter both input ports simultaneously.

The most common 2×2 waveguide splitter circuit element is the resonant directional coupler. This simple directional coupler alone is not suitable as the input stage for a 2×N splitter due to it's wavelength dependence. A resonant directional coupler typically exhibits a ±½-dB stable balance ratio over only about 3% fractional bandwidth.

Another type of 2×2 splitter, known as an adiabatic 2×2 splitter, is known to be wavelength insensitive over a much greater wavelength range provided that it is sufficiently long. This type of splitter is generally not suitable in 2×N splitters for PONs because the extremely shallow converging tapers needed are difficult to manufacture consistently and sufficient device length required to get 30% fractional bandwidth is many times longer than a resonant directional coupler and the overall 2×N splitter size becomes too large to fit in the desired package size and too costly to manufacture. Furthermore, known methods of reducing the size of standard optical-waveguide circuit elements do not provide size reduction for adiabatic devices, and in fact often require an increase in the size of adiabatic devices. There does not seem to be any readily available prospects for practical adiabatic 2×2 splitters as a commodity for the deployment of commercial-scale PON networks.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

In conventional 2×2 splitters, it is difficult/impossible to achieve even splitting for a broadband of wavelengths, though not typically a problem for a given wavelength. The subject invention provides four-port optical waveguide elements that distribute the optical power from one or two inputs into two outputs with the power balance ratio being substantially constant over a wide fractional bandwidth of wavelengths. That is, the devices and methods described herein have the ability to broaden the range of wavelengths over which the splitting ratio is even, or substantially even. The devices described herein are generally non-quadrature devices. Methods to achieve a desired splitting ratio over a broad and ultra-broad wavelength range are also described.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
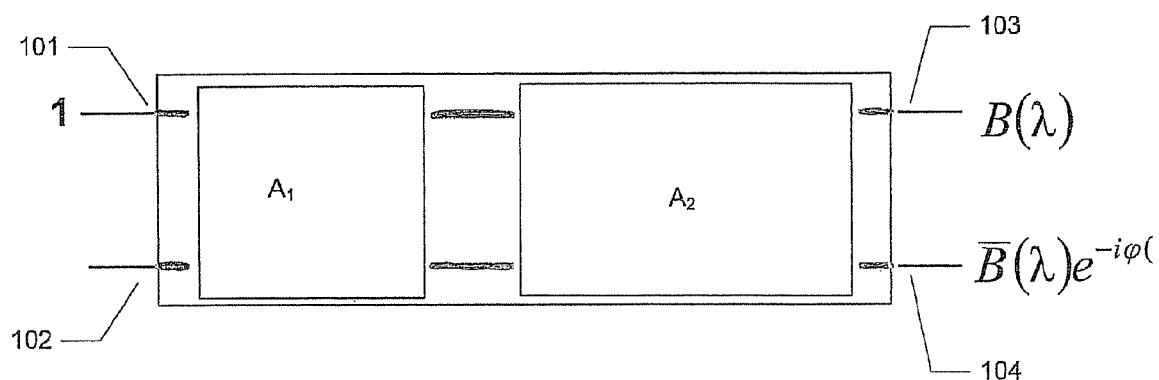
FIG. 1 shows a schematic block diagram of one aspect of the invention.

The optical devices provided herein can be generally illustrated by FIG. 1. In FIG. 1, an optical device 100 has four ports, two input ports 101 and 102 and two output ports 103 and 104. The optical device 100 may be a primary four-port optical mixer capable of distributing the optical power presented at either or both of the two input ports 101, 102 to specified ratios in the output ports 103, 104. The optical device 100 has a first component $A_1$ being a four port mixer having a power-distribution ratio at or about a specific wavelength $\lambda_0$ and a second component $A_2$ being a four-port mixer having a power distribution ratio of dB-magnitude greater than, for example, about 16-dB near wavelength $\lambda_0$. The first component $A_1$ can be in some instances termed a crossover component, such as a directional coupler (including symmetric couplers), Mach-Zehnder interferometers, multimode interference (MMI) couplers, and the like. The second component $A_2$ can be in some instances termed a mixing component, such as asymmetric couplers, Mach-Zehnder interferometers, MMI couplers, star couplers, and the like.

A first interconnecting waveguide connects a first port on the first component $A_1$ to a first port on the second component $A_2$ and a second interconnecting waveguide having a different length than the first interconnecting waveguide connects a complementary second port on the first component $A_1$ to a complementary second port on the second component $A_2$. Typically, the path difference of the second interconnecting waveguide compared to a path difference of the first interconnecting waveguide is greater in magnitude than about a shortest wavelength in the wavelength range. The power-splitting ratio of the primary mixer can exhibit no more than ±1-dB variation over about 20% or more fractional range of optical wavelengths encompassing $\lambda_0$.

In one embodiment, the optical devices provided herein can distribute the optical power from one or two inputs into two outputs with the power balance ratio being substantially constant over a wide fractional bandwidth of wavelengths using two components (that is, less than three components). In another embodiment, the optical devices provided herein can distribute the optical power from one or two inputs into two outputs with the power balance ratio being substantially constant over a wide fractional bandwidth of wavelengths using less than four couplers.

Figure 2:
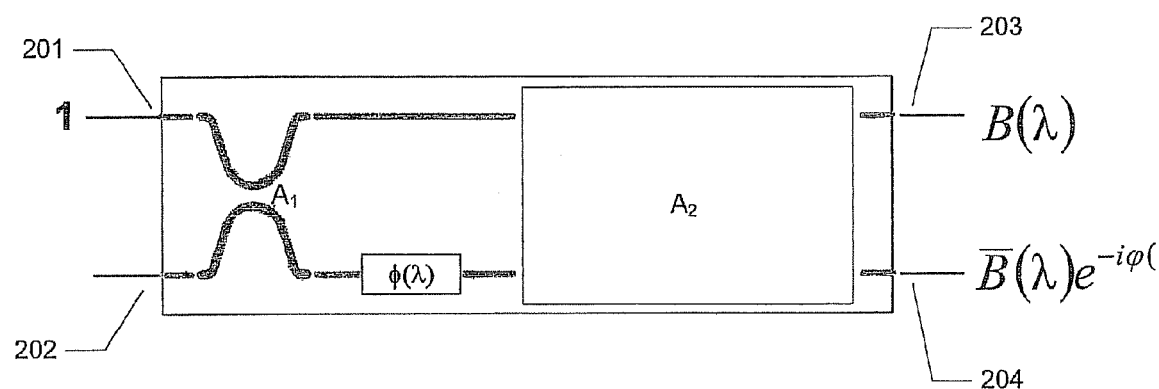
FIG. 2 shows a partial schematic block diagram of another aspect of the invention.

Another general example of the optical devices provided herein can be generally illustrated by FIG. 2. In FIG. 2, an optical device 200 has four ports, two input ports 201 and 202 and two output ports 203 and 204. The optical device 200 is capable of distributing the optical power presented at either or both of the two input ports 201, 202 to specified ratios in the output ports 203, 204. The optical device 200 has a first component $A_1$ being a four port symmetrical directional coupler having a power-distribution ratio at or about a specific wavelength $\lambda_0$ and a second component $A_2$ being a non-quadrature component. Examples of non-quadrature components include asymmetric couplers, Mach-Zehnder interferometers, MMI couplers, 2×2 star-couplers, and the like. A first interconnecting waveguide connects a first port on the first component $A_1$ to a first port on the second component $A_2$ and a second interconnecting waveguide having a different length than the first interconnecting waveguide connects a complementary second port on the first component $A_1$ to a complementary second port on the second component $A_2$. The optical device 200 distributes the optical power from one or two inputs 201, 202 into two outputs 203, 204 with the power balance ratio being substantially constant over a wide fractional bandwidth of wavelengths.

Directional couplers may be constructed by fusing optical fibers together. Alternatively directional couplers may be formed on a PLC. A typical directional coupler in the prior art that is formed on a PLC comprises two straight, parallel optical waveguides that are situated close enough to each other for optical coupling to occur between the waveguides. Typically, each end of each straight waveguide is connected to one end of a curved waveguide. The curved waveguides couple light into and out of the straight waveguides. The length of the straight waveguides is referred to as the length of the coupler. In a directional coupler, a splitting ratio of 0 dB can be achieved for light of at least one polarization and at one particular wavelength and the directional coupler is balanced over a relatively narrow range of wavelengths. A range of wavelengths that exceeds this narrow range of wavelengths is referred to herein as a broad range of wavelengths. The wavelength dependence of a directional coupler can be described according to $$P1 = (\sin(\theta))^2,$$

where $\theta$ is the coupling parameter, which depends on the construction of the directional coupler, the wavelength of the light, and (to a lesser extent) on the polarization of the light. Herein, a range of wavelengths wherein the coupling parameter changes by at least a factor of two is referred to as an ultra-broad range of wavelengths.

A Mach-Zehnder interferometer comprises a first coupler a second coupler, the two couplers are connected with a first Mach-Zehnder arm and a second Mach-Zehnder arm. The first coupler may be a directional coupler, a multi-mode interference coupler, or a star coupler. Likewise, the second coupler may be a directional coupler, a multi-mode interference coupler, or a star coupler. Directional couplers may be constructed by fusing optical fibers together. Alternatively directional couplers may be formed on a PLC. The Mach-Zehnder arms may comprise optical fibers. Alternatively, the Mach-Zehnder arms may comprise optical waveguides formed on a PLC.

A Mach-Zehnder interferometer, which typically comprises a first directional coupler, a second directional coupler, where the directional couplers are optically connected via a first Mach-Zehnder arm and a second Mach-Zehnder arm. In one embodiment, the construction of a Mach-Zehnder interferometer involves providing each directional coupler balanced for light of wavelength ho. Specifically, each directional coupler may have a splitting ratio less than 1 dB, and, even less than about 0.5 dB, for light of wavelength $\lambda_0$. A Mach-Zehnder comprising balanced directional couplers has a local maximum for the splitting ratio for a wavelength of light equal to $\lambda_x$ and predominantly couple light of wavelength $\lambda_x$ into the cross path when the optical path length difference between the Mach-Zehnder arms approximately equals $\lambda_x*(2m-1)/2$, where m is a positive integer. Thus, the Mach-Zehnder can be configured to provide a value of $\lambda_x$ that is close to $\lambda_0$ by configuring the optical path length difference between the Mach-Zehnder arms to be approximately equal to $\lambda_0*(2m-1)/2$, where m is a positive integer. Hence, in one embodiment, the optical path length difference between the Mach-Zehnder arms of the Mach-Zehnder be approximately equal to $\lambda_0*(2m-1)/2$, where m is a positive integer. In this context, an optical path length difference between $\lambda_0*((2m-1)/2+0.03)$ and $\lambda_0*((2m-1)//2-0.03)$ is approximately equal to $\lambda_0*(2m-1)/2$. To achieve this optical path length difference, either the first Mach-Zehnder arm may be longer than the second Mach-Zehnder arm or the second Mach-Zehnder arm may be longer than the first Mach-Zehnder arm. Alternatively, the path length difference may be achieved by constructing the first Mach-Zehnder arm with an optical propagation constant that is different from the optical propagation constant second Mach-Zehnder arm.

In another embodiment, the construction of the Mach-Zehnder involves providing each directional coupler balanced for light of wavelength $\lambda_0$. Specifically, each directional coupler may have a splitting ratio less than 1 dB, and even less than about 0.5 dB, for light of wavelength ho. A Mach-Zehnder comprising balanced directional couplers has a local maximum for the splitting ratio for a wavelength of light equal to $\lambda_x$ and predominantly couple light of wavelength $\lambda_x$ into the bar path when the optical path length difference between the Mach-Zehnder arms approximately equals $\lambda_x*m$, where m is a non-negative integer. Thus, the Mach-Zehnder can be configured to provide a value of $\lambda_x$ that is close to $\lambda_0$ by configuring the optical path length difference between the arms to be approximately equal to $\lambda_0*m$, where m is a positive integer. Hence, the optical path length difference between the arms of the Mach-Zehnder can be approximately equal to $\lambda_0*m$, where m is a non-negative integer. In this context, an optical path length difference between $\lambda_0*(m+0.03)$ and $\lambda_0*(m-0.03)$ is approximately equal to $\lambda_0*m$. To achieve this optical path length difference, either the first arm may be longer than the second arm or the second arm may be longer than the first arm. Alternatively, the path length difference may be achieved by constructing the first arm with an optical propagation constant that is different from the optical propagation constant of the second arm.

Optical 2×2-coupler elements perform a variety of functions, but primarily they provide the function that each output port combines approximately half the light from each input port (assuming the light at each input port comes from a different original optical source). In this case they are also called 2×2 power splitters. If one of the input ports is disregarded, the 2×2 coupler within its balanced wavelength range has the same forward and reverse loss characteristics as a 1×2 splitter/combiner. The 2×2 device simply takes the light that would normally go into unguided loss in a 1×2 device and couples it into a fourth port. In practice however, this fourth port breaks the axial symmetry of the input stage, and the fractional coupling between specific inputs and specific outputs is a function of the frequency (ν) and hence the free-space wavelength (λ) of the optical signal. One of the primary challenges of the optical design of a 2×2 coupler is to suppress the wavelength dependence of the device over the desired wavelength range. In order to examine the basic wavelength dependence of 2×2 coupler structures, a basic mathematical treatment for the behavior of 2×2 optical couplers, including higher-order couplers comprised of multiple cascaded couplers is established. In all cases, efficient devices are assumed. If there are significant losses in the device, those losses would need to be included in the device description as additional ports. This can be handled in similar fashion, but since losses are undesired and the losses can be kept substantially insignificant in 2×2 devices, they are not be accounted in the following descriptions.

The analytic framework presented herein is not common and may be unique, but it is fully comprehensive of the more standard operational descriptions. This framework was chosen to provide clearer insight into the advantages of the optical devices described herein and the methods of employing this framework are one of the components leading to the technical findings that inspired the present invention.

Figure 3:
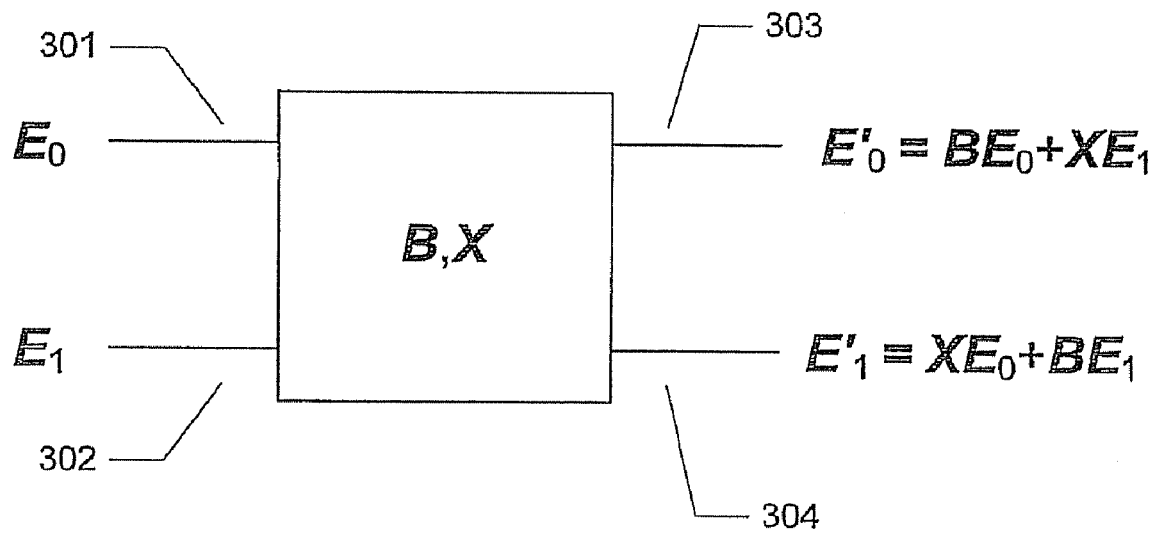
FIG. 3 shows a schematic block diagram of one aspect of the invention.

The basic optical behavior of a 2×2 coupler optical device can be shown as in FIG. 3, regardless of the internal structure. The electric field of the optical signal provided at the first input 301 is represented by the complex value $E_0$, and the electric field presented at the second input 302 is represented by the complex value $E_1$. The composite output electric field $E'_0$ at the first output 303 and the composite output electric field $E'_1$ at the second output 304 can be determined from the complex 'cross' and 'bar' transmission coefficients X and B respectively.

$$E'_0 = B \cdot E_0 + X \cdot E_1 \quad (1)$$

$$E'_1 = B \cdot E_1 + X \cdot E_0 \quad (2)$$

Figure 4:
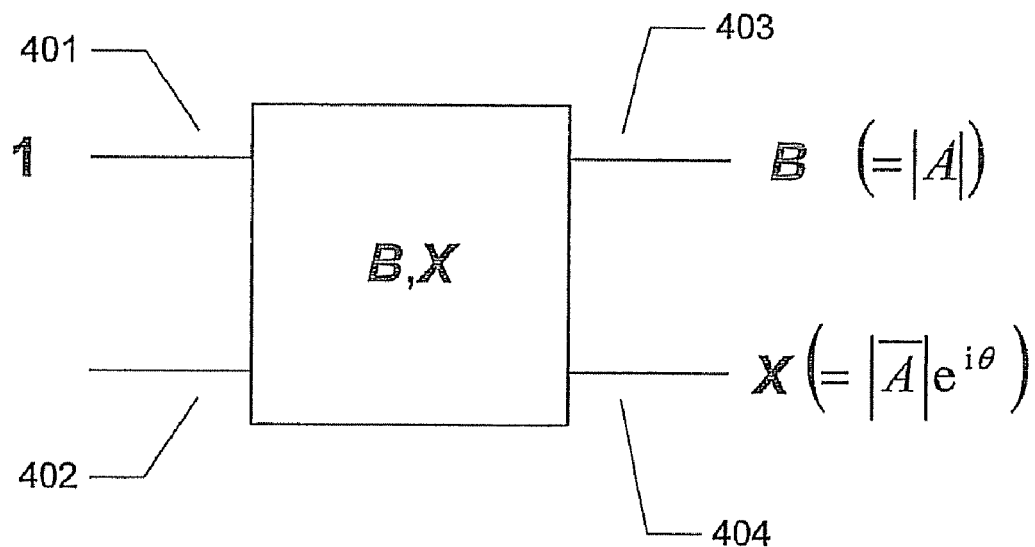
FIG. 4 shows a schematic block diagram of one aspect of the invention.

This shows that the behavior of the 2×2 coupler optical device is determined by the transmission coefficients X and B (functions of λ). Note that for a substantially lossless device then $|X|^2 + |B|^2 = 1$, though the phase of X relative to B is dependent on the internal design of the coupler. If a unit input is imagined at the first input port $E_0 = 1$ and no input at the second input port and recognize that an arbitrary phase adjustment can be applied equally to both output ports with no effect, then let the complex value B equal the real value A and complex value X equal the real value $\overline{A}$ times the complex phase $e^{i\phi}$. These simplified designations are shown in FIG. 4.

For illustrative purposes, the situation where it is desired that half the input power is directed to the first output port and half the input power is directed to the second output port is discussed. This is a common goal for splitters, though other ratios are possible and equally addressed by the inventive optical devices described herein. Equal splitting implies A= $\overline{A} = \sqrt{1/2}$ = app. 0.707. If it is desired to have the balance ratio stable to within ±1.0 dB then A must stay between about 0.665 and 0.747. If ±0.5 dB is required, then A must stay between about 0.686 and 0.727 over wavelength.

Figure 5:
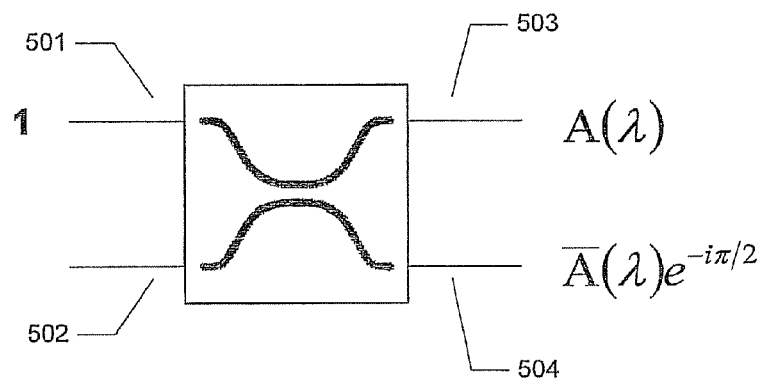
FIG. 5 shows a diagram of a standard directional coupler.

The most common 2×2 waveguide mixer is the simple, symmetric directional coupler. Directional couplers may be constructed by fusing optical fibers together. Alternatively directional couplers may be formed on a planar lightwave circuit. A typical directional coupler that can be formed on a planar lightwave circuit comprises two straight, parallel optical waveguides that are situated close enough to each other for optical coupling to occur between the waveguides. Typically, each end of each straight waveguide is connected to one end of a curved waveguide. The curved waveguides couple light into and out of the straight waveguides. The length of the straight waveguides is referred to as the length of the coupler. An exemplary directional coupler is shown schematically in FIG. 5 with first and second input ports 501 and 502 and first and second output ports 503 and 504. Note also that for the fundamental directional coupler, $\phi = \pi/2$ independent of wavelength. Such a device may be referred to as quadrature device or component.

The ratio of the optical power emerging from the first output port relative to the optical power emerging from the second output port is the balance ratio. In decibel units, the balance ratio equals |10*log(P1/P2)|, where P1 is the optical power emerging from the first output and P2 is the optical power emerging from the second output. An equal division of power is indicated by a balance ratio of 0 dB. The balance ratio of 2×2 optical splitters as described herein is desirably approximately equal to 0 dB over a range of wavelengths. Herein, a 2×2 splitter is said to be "balanced" over a range of wavelengths when the balance ratio is close to 0 dB (i.e., equal to 0 dB within a specified tolerance) within the range of wavelengths. With a specified tolerance of 0.5 dB, for example, a 2×2 splitter is said to be "balanced" when the magnitude of the balance ratio is less than or equal to about 0.5 dB.

Figure 6:
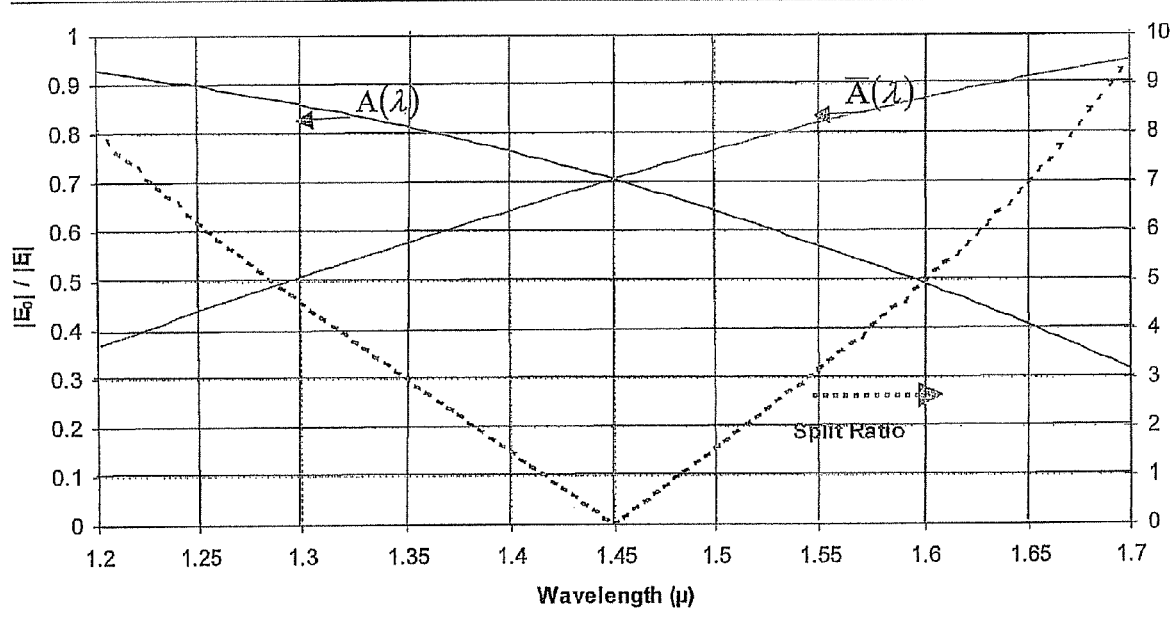
FIG. 6 shows a graph.

Using a known directional coupler, a balance ratio of 0 dB can be achieved for light of one polarization and at one particular wavelength and the directional coupler is balanced over a narrow range of wavelengths (e.g., less than 30 nm). The broad range of wavelengths typically desired in applications such as CWDM and PON substantially exceeds this narrow range of wavelengths. The wavelength dependence of a directional coupler can be reliably predicted or derived from measurement. Typical wavelength performance of a known directional coupler is shown in FIG. 6 for a device balanced at a wavelength of 1.45μ. Here it can be seen that balance ratio exceeds 1 dB for wavelengths not within about 2% of the balanced wavelength.

Figure 7:
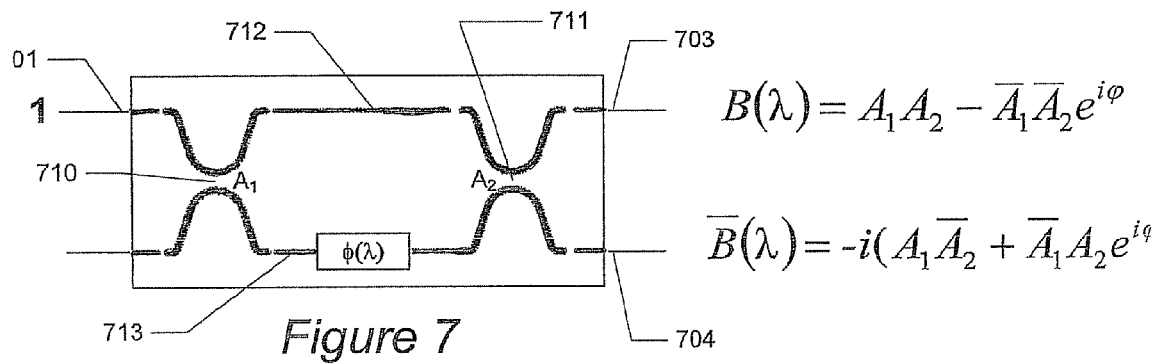
FIG. 7 shows a diagram of a quadrature mixer.

Power dividers are described in the art that contain a static Mach-Zehnder interferometer, such as those described in U.S. Pat. No. 5,044,715, which is hereby incorporated by reference. As illustrated in FIG. 7, this quadrature device is a higher-order four-port device constructed by cascading a first directional coupler 710 having transfer amplitude $A_1(\lambda)$ with a second directional coupler 711 having transfer amplitude $A_2(\lambda)$. Furthermore, one output of the first directional couplers is connected to one input of the second directional coupler with a first Mach-Zehnder arm 712 and the other output of the first directional coupler is connected to the other input of the second directional coupler with a second Mach-Zehnder arm 713. An intentional difference in path length between the two Mach-Zehnder arms imposes a wavelength-dependent phase shift $\phi(\lambda)$ between the two interconnecting optical paths.

Subsequently, the Bar and Cross complex amplitude transfer functions of the composite device as B and $\overline{B}$ (having magnitudes B and $\overline{B}$) respectively are identified to aid in the distinction from the $A_n$ and $\overline{A}_n$ transfer functions of the internal mixers. The Bar and Cross transfer function of the Mach-Zehnder device of FIG. 7 are then:

$$B(\lambda)=A_1(\lambda)A_2(\lambda)-\overline{A}_1(\lambda)\overline{A}_2(\lambda)e^{i\phi} \quad (3)$$

$$\overline{B}(\lambda)=-i(A_1(\lambda)A_2(\lambda)+\overline{A}_1(\lambda)\overline{A}_2(\lambda)e^{i\phi}) \quad (4)$$

In attempts to achieve stable splitting in such a device, the optical path difference between the two Mach-Zehnder arms is optimally selected such that it is about equal or greater than half the longest wavelength in the specified range, but less than the shortest wavelength in the specified range. The couplers are generally designed to have different balanced wavelengths, but the crossover wavelength of each coupler (the wavelength at which the magnitude of A goes to zero) is designed to be greater than the longest wavelength in the specified range.

Figure 8:
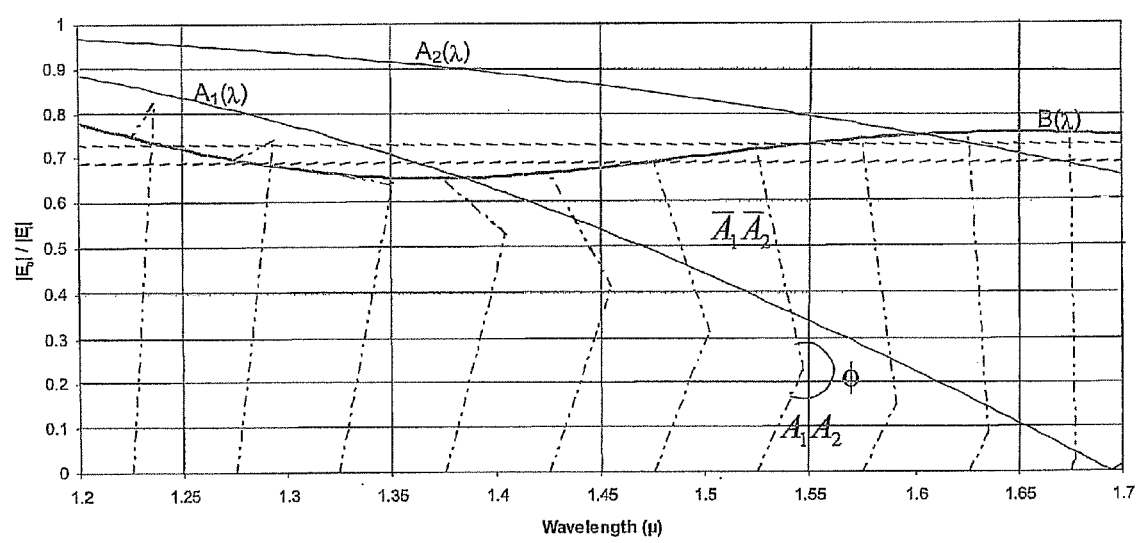
FIG. 8 shows a graph of the quadrature mixer of FIG. 7.

The performance of an optimal solution of this configuration and its components is depicted in the graph of FIG. 8. Here is shown as a function of wavelength the magnitude of the amplitude coupling coefficient of each constituent coupler ($A_1$ and $A_2$) and the resulting magnitude of the composite coefficient B. Also shown are two dashed horizontal lines such that when the composite solution falls between these two lines, the magnitude of the balance ratio is less than 0.5-dB. Also shown in this figure is a series of vectors showing how the complex sum of the additive components in equation 3 produce the composite transfer function magnitude B. It can be seen from this graph that a balanced optical splitter of this design can theoretically reduce variation to values exceeding ±1-dB over the ultra-broad wavelength range, but practically the theoretical values are difficult to impossible to attain.

Figure 9:
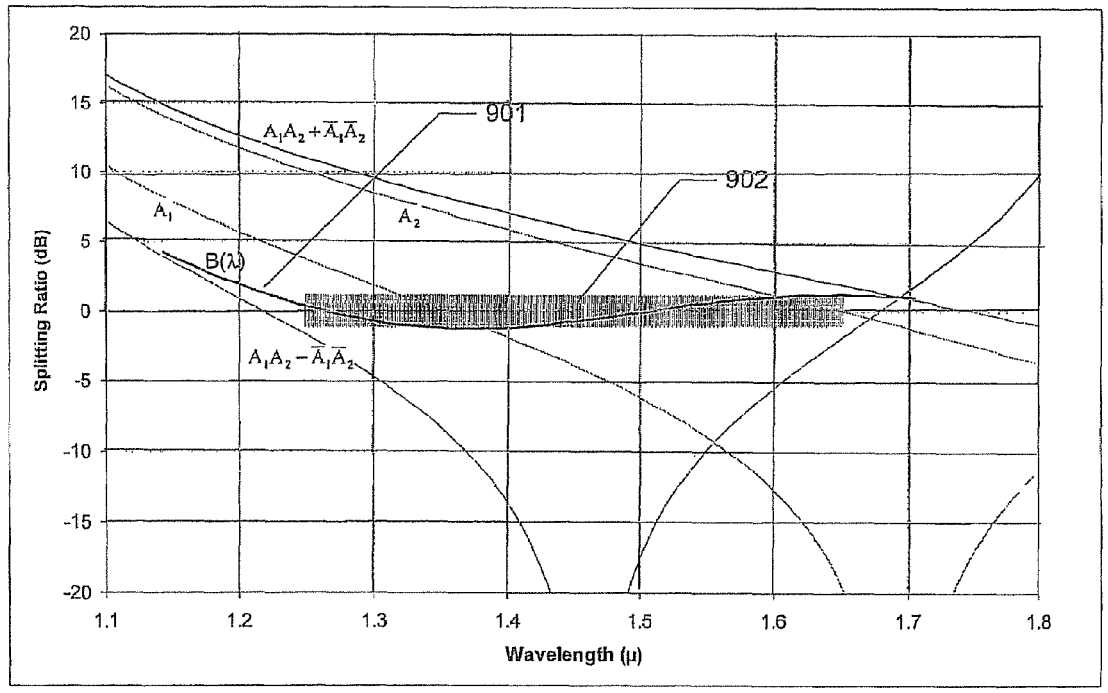
FIG. 9 shows another graph of the quadrature mixer of FIG. 7.

Another graph revealing the behavior and limitations of this type of quadrature device is depicted in FIG. 9. Examining equation 3 reveals that when the phase argument $\phi$ is nearly an odd multiple of $\pi$, the composite transfer function is nearly $A_1A_2+\overline{A}_1\overline{A}_2$ and that when the phase argument is nearly an even multiple of p then the composite transfer function is nearly $A_1A_2-\overline{A}_1\overline{A}_2$. In FIG. 9 the magnitudes of the amplitude transfer functions $A_1$ and $A_2$ in terms of dB vs wavelength are plotted as the lighter indicated lines. The mathematical terms $A_1A_2+\overline{A}_1\overline{A}_2$ and $A_1A_2-\overline{A}_1\overline{A}_2$ are plotted as the darker indicate lines. Here the behavior of the $A_1A_2+\overline{A}_1\overline{A}_2$ term mimics a simple coupler that would have a balanced wavelength somewhat longer than the longest of $A_1$ or $A_2$ and hence lies somewhat above the upper coupler curve. Likewise, the $A_1A_2-\overline{A}_1\overline{A}_2$ term mimics a simple coupler that would have a balanced wavelength somewhat shorter than the shortest of $A_1$ or $A_2$ and hence lies somewhat below the lower coupler curve. By selecting the path length difference to be between about half the longest wavelength and the shortest wavelength, the phase argument $\phi$ is approaching $2\pi$ at the shortest wavelengths in the range and the magnitude of the composite transfer function is near to but greater than the term $A_1A_2-\overline{A}_1\overline{A}_2$. As the wavelength increases, the phase argument $\phi$ lowers continuously towards $\pi$ at the longer wavelengths in the range and the transfer curve transitions smoothly towards the upper term $A_1A_2+\overline{A}_1\overline{A}_2$. By optimizing (usually based on interpolation of empirical measurements) the coupler lengths and the path-length difference, an optimum solution like the transfer curve plotted as the bold line in FIG. 9 can be expected. The grayish rectangular region 902 near the center of the graph in FIG. 9 shows the region within which the magnitude of the balance ratio is less than 1 dB over the desired wavelength range. It can be seen on the graph that the composite transfer function $B(\lambda)$ shown as the bold line 901 for an optimum theoretical solution for a device of this type can reduce balance-ratio variation to just over 1-dB over the ultra-broad wavelength range.

There is a possibility that concatenating additional stages in the same manner as just described may provide further flattening of the wavelength response. There is however no demonstration that such devices do provide enhanced flatness over the ultra-broad wavelength range. Applying the analytic framework utilized herein does not reveal any apparent opportunity to enhanced flattening across the ultra-broad wavelength range by adding further stages according to the same principles. No additional inflection points in the composite wavelength response within that wavelength range and it still spans the wavelength range with an essentially cubic nature just as was shown in FIG. 8 and no substantial improvements in wavelength flatness are made possible by the additional stages while they impose the undesired side-effect of making the device physically larger.

Conventional devices for 2×2 optical power splitters are at best marginally capable of providing a balance ratio that is relatively stable but exceeding ±1-dB over a broad wavelength range. When the normal variations of material index-of-refraction and waveguide dimensions that inevitably occur during manufacturing, plus the polarization sensitivity that occurs over changing temperatures are added in, system designs anticipate a balance ratio range of ±1.5 or even 2 dB in its 2×2 splitter components. The need to accommodate these undesirably high variations means the network operates at reduced data rates/bandwidth and/or uses higher-performance, more expensive parts in other parts in the OLTs and ONUs. Both of these options are clearly undesirable. The optical devices described herein provide for a 2×2 optical power splitter architecture that can be practically and economically manufactured in a reasonably-sized package with a power splitting tolerance of ±1-dB or less over the ultra-broad wavelength range of about 1.25μ to about 1.65μ.

In another embodiment, the optical devices described herein provide for a 2×2 optical power splitter architecture that can be practically and economically manufactured in a reasonably-sized package with a power splitting tolerance of about ±0.75 dB or less over the ultra-broad wavelength range of about 1.25μ to about 1.65μ. In yet another embodiment, the optical devices described herein provide for a 2×2 optical power splitter architecture that can be practically and economically manufactured in a reasonably-sized package with a power splitting tolerance of about ±0.5 dB or less over the ultra-broad wavelength range of about 1.25μ to about 1.65μ. In still yet another embodiment, the optical devices described herein provide for a 2×2 optical power splitter architecture that can be practically and economically manufactured in a reasonably-sized package with a power splitting tolerance of about +0.25 dB or less over the ultra-broad wavelength range of about 1.251μ to about 1.65μ. Herein a target range of wavelengths refers to a range of wavelengths over which it is desirable for the optical devices to have a minimal splitting ratio.

The optical devices described herein are capable of evenly splitting light over a broadband of wavelengths. In one embodiment, the optical devices described herein have an even splitting ratio over a wavelength range of about 100 nm or more (for example, evenly splitting light over a wavelength range from about 1500 nm to about 1600 nm, although any 100 nm range may be selected). In another embodiment, the optical devices described herein have an even splitting ratio over a wavelength range of about 250 nm or more (for example, evenly splitting light over a wavelength range from about 1375 nm to about 1625 nm, although any 250 nm range may be selected). In yet another embodiment, the optical devices described herein have an even splitting ratio over a wavelength range of about 400 nm or more (for example, evenly splitting light over a wavelength range from about 1250 nm to about 1650 nm, although any 400 nm range may be selected). In still yet another embodiment, the optical devices described herein have an even splitting ratio over a wavelength range of about 500 nm or more (for example, evenly splitting light over a wavelength range from about 1200 nm to about 1700 nm, although any 500 nm range may be selected). In another embodiment, the optical devices described herein have an even splitting ratio over a wavelength range of about 600 nm or more (for example, evenly splitting light over a wavelength range from about 1150 nm to about 1750 nm, although any 600 nm range may be selected).

The invention provides a waveguide-based 2×2 optical power splitter component with suppressed wavelength sensitivity over an ultra-broad range of wavelengths. In particular, the optical devices described herein can have a balance ratio of approximately 0 dB and the magnitude of the balance ratio does not exceed about 0.5 dB over a wavelength range from about 1.25µ to about 1.65µ. Other balance ratios are equally possible with similar stability.

Even splitting as described herein means desired splitting. In most applications, the desired splitting ratio is 50-50, thus term even splitting is employed. However, other splitting ratios may be desired, and the optical devices described herein can be tailored to have any desired splitting ratio, such as 60-40, 40-60, 70-30, 30-70, 75-25, 25-75, and the like.

The ratio of the optical power emerging from the first output port relative to the optical power emerging from the second output port is the splitting ratio. In decibel units, the splitting ratio equals $|10*\log(P1/P2)|$, where P1 is the optical power emerging from the first output and P2 is the optical power emerging from the second output. When light enters the first input port, the cross coupling ratio is defined as $10*\log((P1+P2)/P2)$. When light enters the second input port, the cross coupling ratio is defined as $10*\log((P1+P2)/P1)$. Often the splitting ratio of a 2×2 optical splitter is required to be approximately equal to 0 dB over a range of wavelengths. Herein, a 2×2 splitter is said to be "balanced" over a range of wavelengths when the spitting ratio is close to 0 dB (i.e., equal to 0 dB within a specified tolerance) within the range of wavelengths. With a specified tolerance of 0.5 dB, for example, a 2×2 splitter is said to be "balanced" when the splitting ratio is less than or equal to 0.5 dB. Herein, a 2×2 is said to be "perfectly balanced" when the splitting ratio equals 0 dB and the cross coupling ratio equals 3 dB.

The optical devices described herein are based, in part, on the technical findings that a 2×2 power-splitting device with reduced wavelength dependence can be realized by appropriately concatenating a first 2×2 component with a second 2×2 component (no physical order of concatenation implied) wherein the first component exhibits a behavior as or approximating as standard directional coupler having a nominal 0-dB balance ratio at a selected wavelength $\lambda_0$ within the desired wavelength range and the second component has a large magnitude balance ratio at the same selected wavelength. The second component is typically a non-quadrature component.

That is, at least one of two components of the optical devices described herein is a non-quadrature component. The optical devices described herein may contain two non-quadrature components. A quadrature component processes the light at any given input by separating the light into two outputs 90° out of phase with each other. For example, a symmetric directional coupler is a quadrature component. A non-quadrature component is a class of devices that do not comply with the requirements of quadrature devices. Examples of non-quadrature components include asymmetric couplers, Mach-Zehnder interferometers, multimode interference couplers, 2×2 star-couplers, and the like.

Having a large magnitude balance ratio means the magnitude of the amplitude transfer function of the second component is nearly 1.0 or nearly 0.0 at $\lambda_0$ and that sub-component does essentially no power splitting at that wavelength. The balance ratio of the composite device at $\lambda_0$ matches the balance ratio of the first component. As the wavelength differs from $\lambda_0$ the combination of the transfer function of the second component and the optical path length difference of the waveguides connecting the two components provide compensation for the change in balance ratio of the first component.

The optical devices described herein are based, in part, on an architecture enabling the incorporation of two phenomena that are typically detrimental to broadband stability in optical devices: 1) the optical path difference of the two arms connecting the first and second components can be substantially longer than the shortest wavelength in the wavelength range; and 2) the magnitude of the amplitude coupling coefficient in the second component can be non-monotonic across the wavelength range. These phenomena can be used to provide additional inflections in the composite transfer function across the ultra-broad wavelength range without substantially increasing the slope, and hence amplitude variation, between the inflection points. It is these additional inflection points and reduced amplitude variations that enable bounding of the magnitude of the composite transfer function within a very narrow range over an ultra-broad range of wavelengths. The preference for a non-monotonic transfer function in the second component generally precludes the use of a simple symmetric directional coupler for this component. In other words, the second component is a non-quadrature component.

Figure 10:
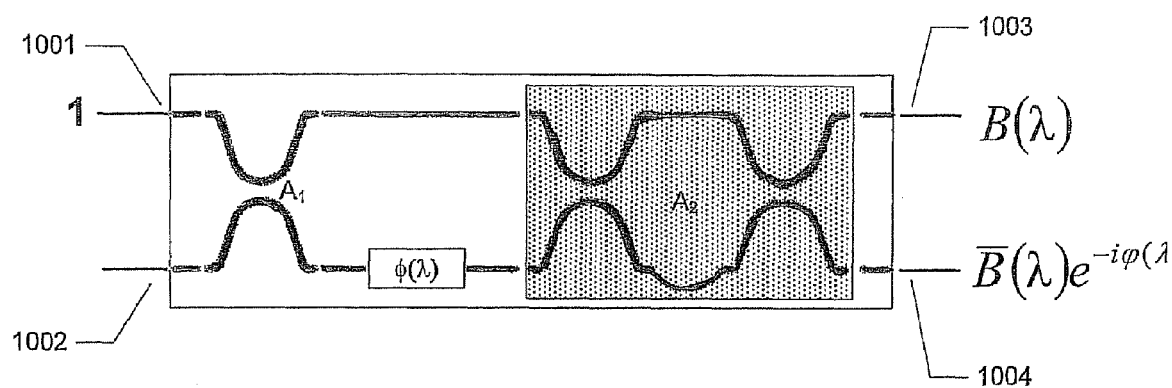
FIG. 10 shows a partial schematic diagram of a device of an aspect of the invention.

One embodiment is depicted in FIG. 10. This shows the concatenation of a first component which is a symmetric directional coupler with a second component which is a Mach-Zehnder interferometer. The first and second components are optically linked by two connecting waveguides, and a difference in optical path between the two connecting waveguides provides for a wavelength-dependent phase shift between the interconnecting links. To demonstrate an optimal solution utilizing this embodiment (usually optimized by iteratively manipulating the fundamental parameters), the symmetrical directional coupler is designed so that the 0-dB balance ratio is at a wavelength of about 1.6µ. The two couplers within the Mach-Zehnder component are designed to both have the same 0-dB balance point, in this example also about 1.6µ. The optical path-length difference with the Mach-Zehnder is about 2.4µ such that at a wavelength of 1.6µ the phase argument in equation 3 is about 3π. This means that for the Mach-Zehnder component, $B(\lambda_0) \cong 1$; $\overline{B}(\lambda_0) \cong 0$. The optical path-length difference connecting the first and second components in this example is about 1.45µ.

Figure 11:
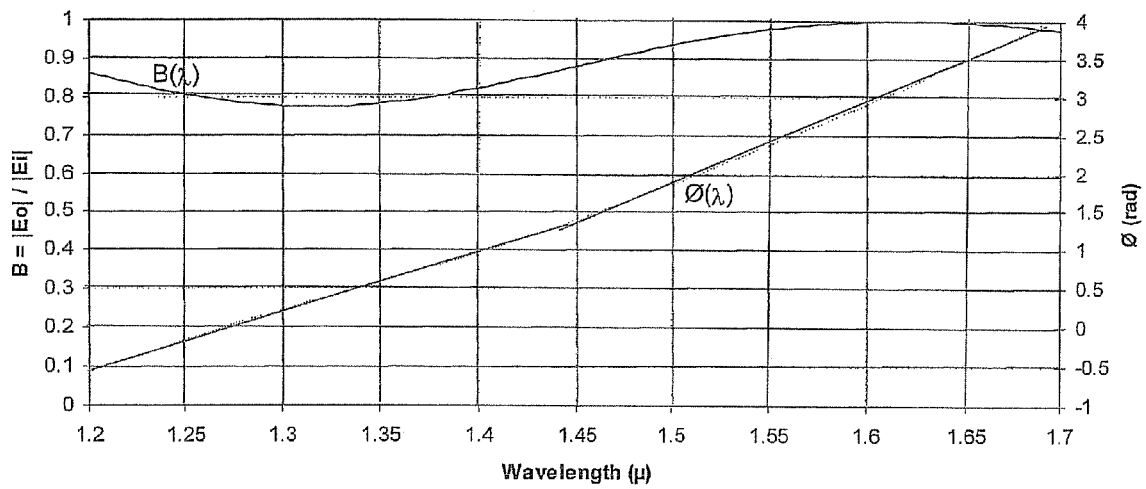
FIG. 11 shows a graph of the device of FIG. 10.

Using these parameters, the magnitude of the amplitude transfer function of just the Mach-Zehnder component is plotted in FIG. 11. Here it can be seen that the coupling coefficient of the Mach-Zehnder component varies by a large amount over the ultra-broad wavelength range and that it is essentially in the bar-state ($|B|=1$) at $\lambda_0$. Also plotted in this figure is the phase variation of the Mach-Zehnder component across the ultra-broad wavelength range. It can be seen that the phase of the transfer function for this component varies by more than π across the wavelength range, notably distinct from the constant π/2 phase of the symmetric directional coupler.

Combining this Mach-Zehnder with the standard directional coupler, the wavelength behavior of the two components is shown in FIG. 10. The Mach-Zehnder transfer function is shown again labeled $A_1(\lambda)$, the symmetric coupler transfer function is shown labeled $A_2(\lambda)$, and the total transfer function of the composite optical device is shown by the thicker line labeled $B(\lambda)$. The horizontal dashed lines show the 0.5-dB stability limits, and as in FIG. 8 the additive components of equation 3 are shown at several wavelengths. The graph of FIG. 10 clearly shows the additional inflection in the composite transfer function introduced by the novel architecture and how that can be exploited to provide less wavelength variation over a broader wavelength range than conventional devices.

Figure 12:
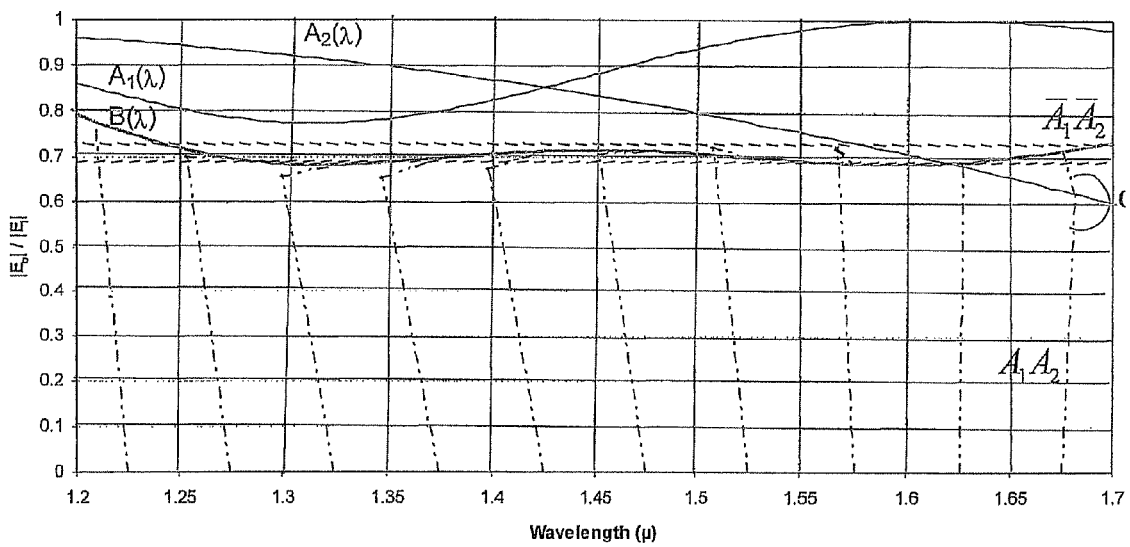
FIG. 12 shows another graph of the device of FIG. 10.

Another embodiment is depicted in FIG. 11. This employs a symmetric directional coupler balanced at a wavelength of $\lambda_0$ for the first component, and an asymmetric coupler as the second component. The asymmetric coupler as depicted in FIG. 12 is a directional coupler wherein the optical propagation constant (effective index of refraction) in one of the coupled waveguides is slightly different than in the other. This can be achieved by making one of the waveguides a slightly different width than the other, and this is how it is depicted in the figure, but there are numerous other known ways to introduce the difference by altering various dimensions or material properties of one or other of the coupled waveguides or their environment.

Asymmetric couplers are more inherently challenging to accurately model and produce than symmetric couplers. In the following example, the asymmetric coupler models used are derived from empirical studies of a large population of various silica-on-silicon asymmetric coupler structures using suitable production procedures. It is likely that asymmetric couplers made in other material systems or by different means may require numerically different parameters to produce equivalent behavior, but presumably a similar study can reveal those parameters as well.

The asymmetry of an asymmetric coupler is a function of wavelength. At shorter wavelengths, the asymmetry is more pronounced and very little light can be coupled into the cross state ($\bar{B}$) regardless of coupler length. At longer wavelengths, almost all the light may couple into the cross state for the right coupler length. Asymmetric couplers are rarely used commercially and as yet there is no conventional standard for expressing the wavelength dependence of an asymmetric coupler. The asymmetric coupler for purposes herein can be characterized by two wavelengths: the 50% wavelength indicating the wavelength at which the maximum fraction of optical power that can be coupled into the cross state is 50%, and the 90% wavelength at which of course the maximum fraction of the input power that can be coupled into the cross state would be 90%. It is noted that either or both of these wavelengths may be outside the normal operating range of the device, they are merely parameters that are used to express the shape of the asymmetry curve across the operating wavelength range. It is also noted that the coupler length required to get 50% coupling at the 50% wavelength generally cannot be the same as the length required to get 90% coupling at the 90% wavelength and it should not be expected that the transfer function of a coupler having a specific length to be equivalent to either 50% at the 50% wavelength or to 90% at the 90% wavelength.

Bearing the preceding in mind, as an example the asymmetric coupler selected for the example of this embodiment has a 50% wavelength of 1.19μ, a 90% wavelength of 2.6μ, and a coupler length of 292μ, which is slightly less than the coupling length required to get 50% coupling at the 50% wavelength. This provides a bar state ($|B|\cong1$) at a wavelength of about 1.6μ. The performance characteristics of this coupler component are graphed in FIG. 13. Here it can be seen that the characteristic behavior of the asymmetric coupler across the ultra-broad wavelength range can be designed to closely resemble the behavior of the Mach-Zehnder component of the previous embodiment. However, whereas the Mach-Zehnder component is necessarily several mm long, the asymmetric coupler component can be well under 1 mm long, enabling an overall smaller device, hence fitting more total devices on a wafer for more economical manufacturing.

Figure 14:
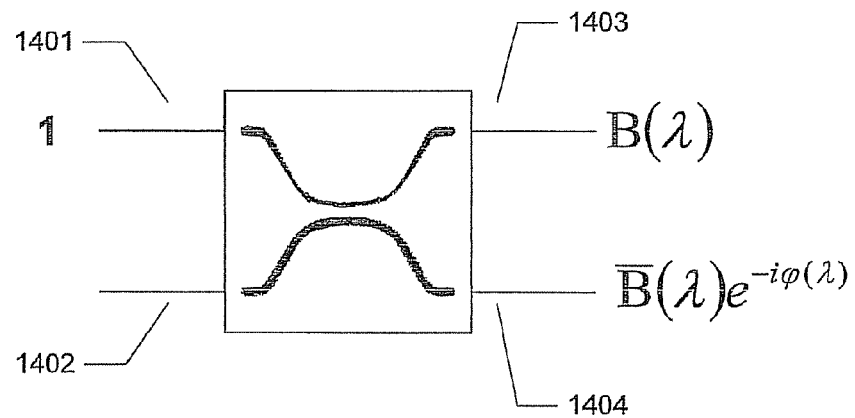
FIG. 14 shows a partial schematic diagram of a device of another aspect of the invention.
Figure 13:
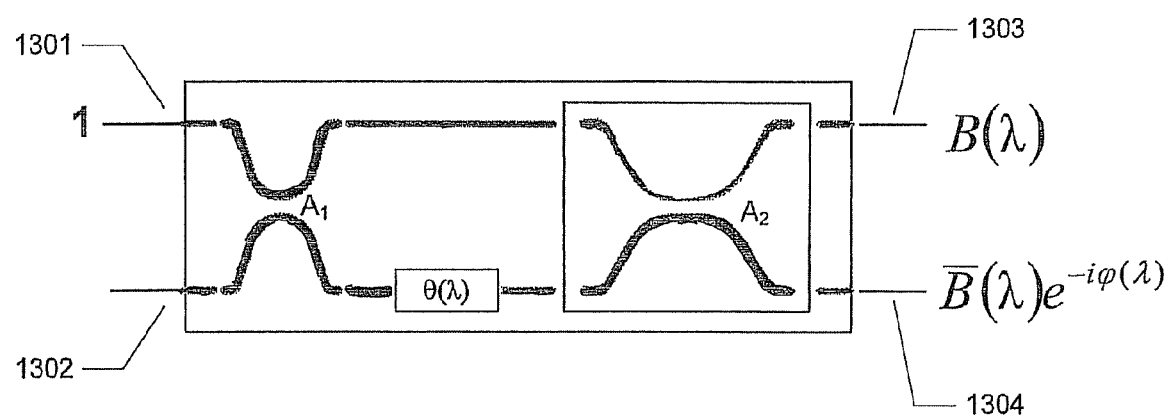
FIG. 13 shows a partial schematic diagram of a device of another aspect of the invention.
Figure 15:
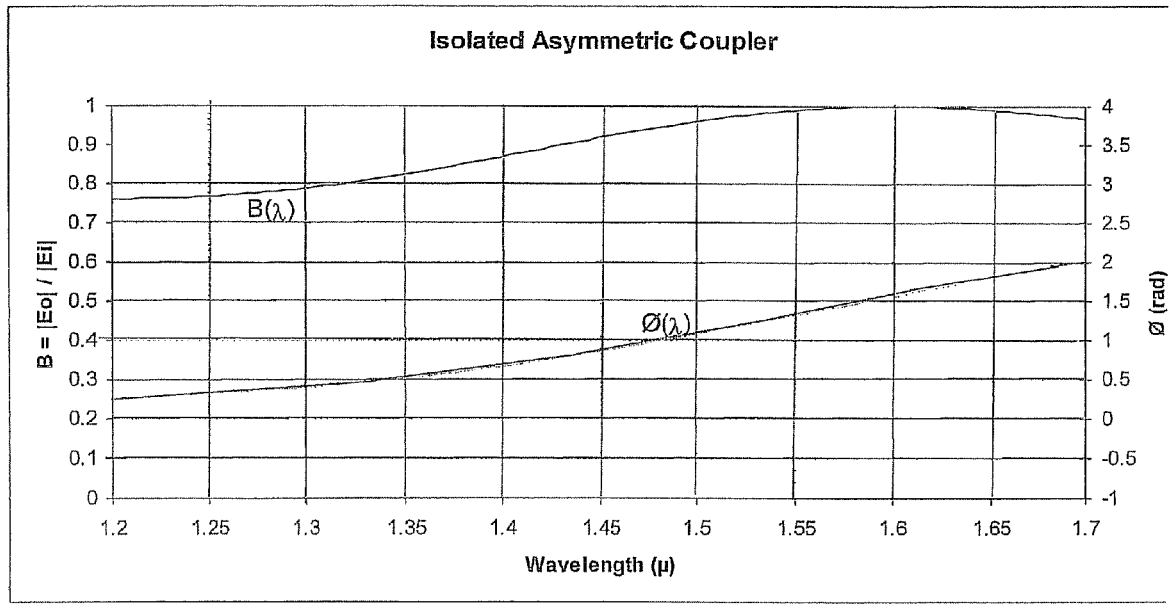
FIG. 15 shows a graph of the device of FIG. 13.

It is noted in FIG. 13 that the phase variation of the asymmetric coupler across the wavelength range is somewhat less that the variation of the Mach-Zehnder shown in FIG. 11. This difference may be compensated, most easily by reducing the optical path difference interconnecting the components as compared to the previously described Mach-Zehnder embodiment. For this example, the optical path difference interconnecting the components is reduced to 0.54μ and the predicted behavior of the composite device is plotted in FIG. 14. It is noted that the vertical scale in FIG. 14 is zoomed-in twice as much as in FIGS. 8 and 10 to better show the stability range. It can be seen from this example that, although the device utilizing the asymmetric coupler is more challenging to manufacture, it can both be smaller and have less variation over a broader wavelength range than even the Mach-Zehnder embodiment described previously.

Other 2×2 components that can be utilized to make the optical devices described herein include multimode interference (MMI) couplers and 2×2 star-couplers. The unbalanced 2×2 component (that is, the non-quadrature component) can be configured such that the magnitude of the balance ratio near $\lambda_0$ is at least greater than about 16 dB to provide less than 1-dB variation. In another embodiment, the unbalanced 2×2 component (that is, the non-quadrature component) can be configured such that the magnitude of the balance ratio near $\lambda_0$ is at least greater than about 19 dB to provide less than about 0.5-dB variation. The optimal peak wavelength of the unbalanced component is not necessarily exactly the same as the balance wavelength of the balanced component and may in fact be different by about 1-2% to minimize overall variation across the entire wavelength range. Also, in selecting the optical path length difference between the interconnecting, one of the selection criteria can include the criteria that the device is insensitive to variations is the fabrication process.

Other embodiments of the Mach-Zehnder interferometer component may be utilized that are in the bar-state ($|B|\cong1$) at about $\lambda_0$ by having an optical path difference of approximately $(2m+1)/2*\lambda_0$, where m is an integer. Other embodiments of the Mach-Zehnder interferometer component may be utilized that are in the cross state ($|B|\cong0$) at about $\lambda_0$ by having an optical path difference of approximately $m*\lambda_0$ where m is an integer. Other embodiments of the Mach-Zehnder interferometer component may be utilized where the optical path difference may be intentionally offset by up to about 3% to better compensate for polarization-dependent variations. Other embodiments of the Mach-Zehnder interferometer component may be utilized wherein one or both directional couplers are replaced by multi-mode interference couplers. Other embodiments of the Mach-Zehnder interferometer component may be utilized wherein one or both of the directional couplers are replaced by star couplers.

Although the embodiments described herein are based on planar lightwave circuits (PLCs), it should be readily apparent to anyone skilled in the art that the invention applies equally to any optical technology wherein multi-port mixing elements can be coherently concatenated. The optical devices described herein are also applicable to microwave and radio-frequency mixers, though the needs addressed there are not as broad since there are other means of broadband power splitting available.

The design details that provide the required balance ratios depend on the material system used to comprise the components. In a first example of a suitable waveguide geometry and material system, the PLC material system comprises silica layers on a substrate. In this example, a core layer is situated between a bottom cladding layer and a top cladding layer, wherein the index of refraction of the about 4 to about 10 µm thick core layer is higher than that of the bottom cladding by about 0.07 µm and wherein the index of refraction of the top and bottom cladding layers are approximately equal (within about 0.01 µm). Waveguides are formed by etching regions with a rectangular cross-section which are covered by the top cladding material. A directional coupler can be formed from two adjacent waveguides that can be about 4 to about 10 µm wide and have region of top cladding material between them that is about 4 to about 10 µm wide. Each end of each straight waveguide can be connected to a curve waveguide with a radius of curvature of about 10 to about 20 mm. Detailed examples of several of the described embodiments are described below with respect to this waveguide geometry and material system; however, other suitable waveguide geometry and material systems may be used for the optical devices described herein.

Further, in the numerical examples described below one advantage of the optical devices described herein is to provide a 2×2 splitter that is balanced over the target range of wavelengths from about 1260 nm to about 1625 nm. With the waveguide geometry and material system described above, the coupling parameter of a directional coupler varies by more than a factor of two over the range of wavelengths from about 1260 nm to about 1625 nm. Hence a device is needed that provides balanced splitting over an ultra-broad range of wavelengths. Further, a tolerance of 1 dB or less is used in the definition of balanced splitting for the examples that follow.

In a second example of the first embodiment, the balanced component comprises a directional coupler that is 800 µm in length and is perfectly balanced at a wavelength that is approximately equal to 1580 nm, i.e., $\lambda_0$=1580 nm. The unbalanced or non-quadrature component comprises a Mach-Zehnder interferometer that further comprises a first directional coupler that is 734 µm in length and a second directional coupler that is 750 µm in length. The optical path length difference between the arms of the Mach-Zehnder interferometer is designed according to the first embodiment with m=3. Specifically, the optical path length of the first Mach-Zehnder arm is larger than the optical path length of the second Mach-Zehnder arm by about 2379 nm. The unbalanced component has a balance ratio greater than 20 dB for wavelengths between 1560 nm and 1605 nm, which encompasses $\lambda_0$. The unbalanced component predominantly couples light into the bar path for wavelengths between 1560 nm and 1605 nm. A numerical search is used to find the optimum optical path length difference between the arms of the broadband 2×2 splitter. With an optical path length in the first bridging arm that is 1421 nm shorter than the optical path length in the second bridging arm, balanced splitting to a tolerance of 0.5 dB can be achieved (in simulation) over a target wavelength range of between 1260 nm and 1625 nm in this example. In this example, the optical path length difference between the arms has a value that lies within the target wavelength range.

In a first example of the third embodiment, the unbalanced component comprises a directional coupler that is 2951 µm in length. This unbalanced component has a balance ratio greater than 20 dB for wavelengths between 1360 nm and 1385 nm, such that light is predominantly coupled into the cross path in this wavelength range. The balanced component or non-quadrature component comprises a Mach-Zehnder interferometer that further comprises a first directional coupler that is 102 µm in length and a second directional coupler that is 1027 µm in length. The optical path length of the first Mach-Zehnder arm is 2670 nm longer than the optical path length of the second Mach-Zehnder arm. The balanced component is balanced at a wavelength that is approximately equal to 1370 nm, i.e., $\lambda_0$=1370 nm. The unbalanced component has a balance ratio greater than 20 dB for wavelengths between 1360 nm and 1385 nm, which encompasses $\lambda_0$. A numerical search is used to find the optimum optical path length difference between the arms of the broadband 2×2 splitter. With an optical path length in the first bridging arm that is 2245 µm shorter than the optical path length in the second bridging arm, balanced splitting to a tolerance of 1 dB can be achieved (in simulation) over the target wavelength range, in this example.

In a second example of the third embodiment, the unbalanced component comprises a directional coupler that is 1830 µm in length. This unbalanced component has a balance ratio greater than 20 dB for wavelengths between 1545 nm and 1595 nm, such that light is predominantly coupled into the cross path in this wavelength range. The balanced component or non-quadrature component comprises a Mach-Zehnder interferometer that further comprises a first directional coupler that is 965 µm in length and a second directional coupler that is 117 µm in length. The optical path length of the first Mach-Zehnder arm is 2066 nm longer than the optical path length of the second Mach-Zehnder arm. The balanced component is balanced at a wavelength that is approximately equal to 1570 nm, i.e., $\lambda_0$=1570 nm, which lies within the range of wavelengths over which the unbalanced component provides a balance ratio greater than 20 dB. A numerical search is used to find the optimum optical path length difference between the arms of the broadband 2×2 splitter. With an optical path length in the first bridging arm that is 2300 µm longer than the optical path length in the second bridging arm, balanced splitting to a tolerance of 1 dB can be achieved (in simulation) over the target wavelength range, in this example.

In an example of the fourth embodiment, the unbalanced or non-quadrature component comprises a Mach-Zehnder interferometer that further comprises a first directional coupler that is 720 µm in length and a second directional coupler that is 720 µm in length. The optical path length of the first Mach-Zehnder arm is 2370 nm longer than the optical path length of the second Mach-Zehnder arm. This unbalanced component has a balance ratio greater than 20 dB for wavelengths between 1550 nm and 1610 nm, such that light is predominantly coupled into the cross path in this wavelength range. The balanced component comprises a first directional coupler that is 945 µm in length and a second directional coupler that is 47 µm in length. The optical path length of the first Mach-Zehnder arm is 2666 nm longer than the optical path length of the second Mach-Zehnder arm. With an optical path length in the first bridging arm that is 1446 nm shorter than the optical path length in the second bridging arm, balanced splitting to a tolerance of 1 dB can be achieved (in simulation) over the target wavelength range, in this example.

As described above, the broadband 2×2 splitter comprises a crossover component and a non-quadrature component that are optically connected via a first bridging arm and a second bridging arm. In one embodiment, the non-quadrature component is a 2×2 optical splitter that provides a splitting ratio about equal to 0 dB for at least one polarization of light and at least one wavelength of light, $\lambda_0$. The crossover component is a 2×2 optical splitter that provides a splitting ratio that varies with wavelength such that the splitting ratio has a local maximum for light of at least one polarization at a wavelength $\lambda_x$ such that the splitting ratio at the local maximum is at least greater than about 16 dB or even greater than about 19 dB. The optical device can be configured such that $\lambda_0$ and $\lambda_x$ are relatively close in value. Specifically, the optical device can be configured such that the crossover component provides a splitting ratio greater than about 16 dB for light of wavelength ho. In other words, the crossover component either predominantly couples light of wavelength $\lambda_0$ into the cross path, or predominantly couples light of wavelength ho into the bar path. With this construction, for light of wavelength ho, the broadband 2×2 splitter is balanced within a tolerance that is determined by the splitting ratio of the crossover component.

If the splitting ratio at ho of the crossover component is greater than about 16 dB, then the splitting ratio of the broadband splitter is less than 1 dB. If the splitting ratio at ho of the crossover component is greater than about 19 dB, then the splitting ratio of the broadband splitter is less than about 0.5 dB. $\lambda_0$ may lie within the target wavelength range to ensure that balanced splitting occurs for at least one wavelength within the target wavelength range, although this is not necessary. To facilitate configuring the device such that $\lambda_x$ is close in value to $\lambda_0$, the device can be configured such that $\lambda_x$ lies within the target range of wavelengths; hence, the crossover component may have a splitting ratio that has a non-monotonic dependence on wavelength. Balanced splitting can be achieved for an ultra-broad range of wavelengths by starting with this construction and optimizing the optical path length of the first bridging arm relative to the optical path length of the second bridging arm. In selecting the optimal optical path length difference between the bridging arms, a selection criterion include the criterion that the variation of the splitting ratio over all polarizations of light remain less than a predetermined value. Also, in selecting the optical path length difference between the bridging arms, a selection criterion may include the criterion that the device is insensitive to variations is the fabrication process.

The broadband splitter is suitable for a variety of waveguide geometry and material systems. For example, the material system may comprise silica layers on a substrate, which may either comprise silicon or quartz. Other suitable material systems include polymer layers, silicon-on-insulator, and layers of semiconductor materials based on the InP system or the GaAs system.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An optical device, comprising
   a crossover component comprising a first 2×2 splitter, the first 2×2 splitter comprising a first input port, a second input port, a first output port, and a second output port;
   a non-quadrature component comprises a second 2×2 splitter, the second 2×2 splitter comprising a first input port, a second input port, a first output port, and a second output port;
   a first optical waveguide having a first optical path length, a first end that is optically coupled to the first output port or first input port of the crossover component, and a second end that is optically coupled to the first input port or first output port of the non-quadrature component; and
   a second optical waveguide having a second optical path length that is different from the first optical path length, a first end that is optically coupled to the second output port or second input port of the crossover component, and a second end that is optically coupled to the second input port or the second output port of the non-quadrature component,
   the optical device having a power splitting tolerance of ±1-dB or less over an ultra-broad wavelength range of about 1.25µ to about 1.65µ.

2. The optical device of claim 1, wherein the non-quadrature component being configured to provide a 0 dB splitting ratio for light of at least one polarization and one wavelength, $\lambda_0$, and configured to provide a splitting ratio that is less than 1 dB through a first continuous range of wavelengths that includes $\lambda_0$.

3. The optical device of claim 1, wherein at least one of the crossover component and the non-quadrature component comprises a Mach-Zehnder interferometer.

4. The optical device of claim 1, wherein at least one of the crossover component and the non-quadrature component comprises an asymmetric coupler.

5. The optical device of claim 1, wherein at least one of the crossover component and the non-quadrature component comprises a star coupler.

6. The optical device of claim 1, wherein at least one of the crossover component and the non-quadrature component comprises a multi-mode interference coupler.

7. The optical device of claim 1, wherein the difference between the first optical path length and the second optical path length provides a splitting ratio that is less than 1 dB over a first continuous range of wavelengths.

8. The optical device of claim 7, wherein the difference between the first optical path length and the second optical path length provides a splitting ratio that is less than 1 dB over a second continuous range of wavelengths; the second continuous range of wavelengths being broader than the first continuous range of wavelengths.

9. The optical device of claim 1, wherein at least one of the crossover component and the non-quadrature component comprises a symmetrical directional coupler having a coupling parameter that varies by more than a factor of two over said second continuous range of wavelengths.

10. The optical device of claim 1, wherein a difference between the second optical path length and the first optical path length is about equal to a value that is within a target range of wavelengths.

11. The optical device of claim 1, wherein the crossover component being configured to provide a splitting ratio greater than 16 dB for light of at least one polarization at wavelength $\lambda_0$.

12. A PLC comprising the optical device of claim 1.

13. An optical device comprising a primary four-port optical mixer capable of distributing optical power presented at either of two input ports to specified ratios in two output ports, the four-port mixer comprising a first component being a four port mixer having a power-distribution ratio at or about a specific wavelength $\lambda_0$; a second component being a four-port mixer having a power distribution ratio of dB-magnitude greater than 16-dB near wavelength $\lambda_0$; a first interconnecting waveguide connecting a first port on the first component to a first port on the second component; and a second interconnecting waveguide having a different length than the first interconnecting waveguide connecting a complementary second port on the first component to a complementary second port on the second component; wherein a power-splitting ratio of the primary mixer exhibits no more than ±1-dB variation over a 20% fractional range of optical wavelengths encompassing $\lambda_0$.

14. The optical device of claim 13, wherein a power-division ratio of the second component varies non-monotonically across the fractional range of optical wavelengths.

15. The optical device of claim 13, wherein the first component is a symmetric directional coupler.

16. The optical device of claim 13, wherein the second component comprises a Mach-Zehnder interferometer having an optical path length difference greater than about a shortest wavelength in the fractional range of optical wavelengths.

17. The optical device of claim 13, wherein a path difference of the second interconnecting waveguide compared to a path difference of the first interconnecting waveguide is greater in magnitude than about a shortest wavelength in the wavelength range.

18. The optical device of claim 13, wherein the second subcomponent comprises an asymmetric coupler.

19. The optical device of claim 13 having an even splitting ratio over a wavelength range of about 100 nm or more.

20. A PLC comprising the optical device of claim 13.

21. An optical device, comprising
a crossover component comprising a first 2×2 splitter, the first 2×2 splitter comprising a first input port, a second input port, a first output port, and a second output port;
a non-quadrature component comprises a second 2×2 splitter, the second 2×2 splitter comprising a first input port, a second input port, a first output port, and a second output port;
a first optical waveguide having a first optical path length, a first end that is optically coupled to the first output port or first input port of the crossover component, and a second end that is optically coupled to the first input port or first output port of the non-quadrature component; and
a second optical waveguide having a second optical path length that is different from the first optical path length, a first end that is optically coupled to the second output port or second input port of the crossover component, and a second end that is optically coupled to the second input port or the second output port of the non-quadrature component,
wherein the non-quadrature component being configured to provide a 0 dB splitting ratio for light of at least one polarization and one wavelength, $\lambda_0$, and configured to provide a splitting ratio that is less than 1 dB through a first continuous range of wavelengths that includes $\lambda_0$; the crossover component being configured to provide a splitting ratio greater than 16 dB for light of at least one polarization at wavelength $\lambda_0$.

22. The optical device of claim 21, wherein at least one of the crossover component and the non-quadrature component comprises a Mach-Zehnder interferometer.

23. The optical device of claim 21, wherein at least one of the crossover component and the non-quadrature component comprises an asymmetric coupler.

24. The optical device of claim 21, wherein at least one of the crossover component and the non-quadrature component comprises a star coupler.

25. The optical device of claim 21, wherein at least one of the crossover component and the non-quadrature component comprises a multi-mode interference coupler.

26. The optical device of claim 21, wherein the difference between the first optical path length and the second optical path length provides a splitting ratio that is less than 1 dB over a first continuous range of wavelengths.

27. The optical device of claim 26, wherein the difference between the first optical path length and the second optical path length provides a splitting ratio that is less than 1 dB over a second continuous range of wavelengths; the second continuous range of wavelengths being broader than the first continuous range of wavelengths.

28. The optical device of claim 21, wherein at least one of the crossover component and the non-quadrature component comprises a symmetrical directional coupler having a coupling parameter that varies by more than a factor of two over said second continuous range of wavelengths.

29. The optical device of claim 21, wherein a difference between the second optical path length and the first optical path length is about equal to a value that is within a target range of wavelengths.

* * * * *

UNITED STATES PATENT AND TRADEMARK OFFICE
CERTIFICATE OF CORRECTION

PATENT NO. : 7,587,138 B2  Page 1 of 4
APPLICATION NO. : 11/678485
DATED : September 8, 2009
INVENTOR(S) : Mc Greer et al.

It is certified that error appears in the above-identified patent and that said Letters Patent is hereby corrected as shown below:

The error occurs in the patent in the published figure on Page 1, and on Drawing Sheets 1 of 8, 3 of 8, 5 of 8, 6 of 8 and 8 of 8.
The published figure should be:

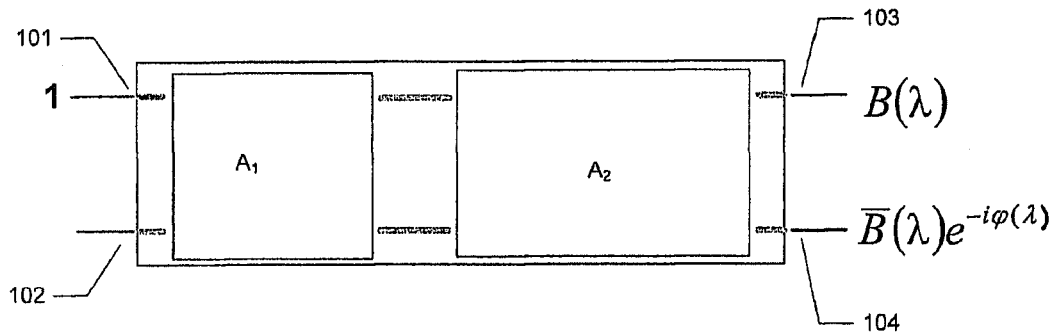

Drawing Sheet 1 of 8 - Figure 1 should be:

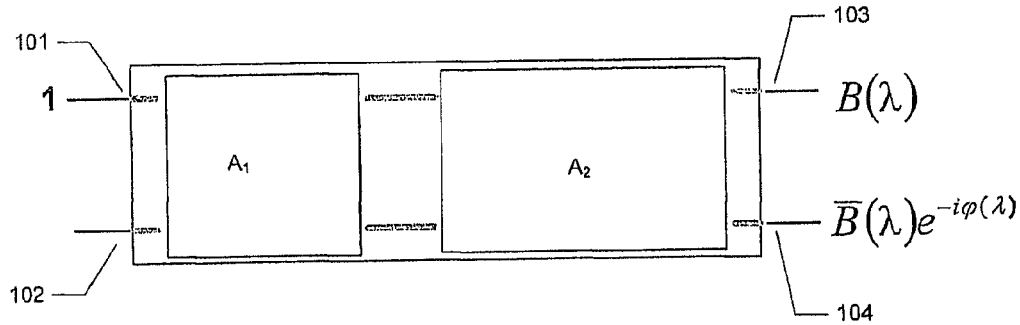

Figure 1

Signed and Sealed this

Twenty-second Day of June, 2010

David J. Kappos
*Director of the United States Patent and Trademark Office*

CERTIFICATE OF CORRECTION (continued)
U.S. Pat. No. 7,587,138 B2

Drawing Sheet 1 of 8 - Figure 2 should be:

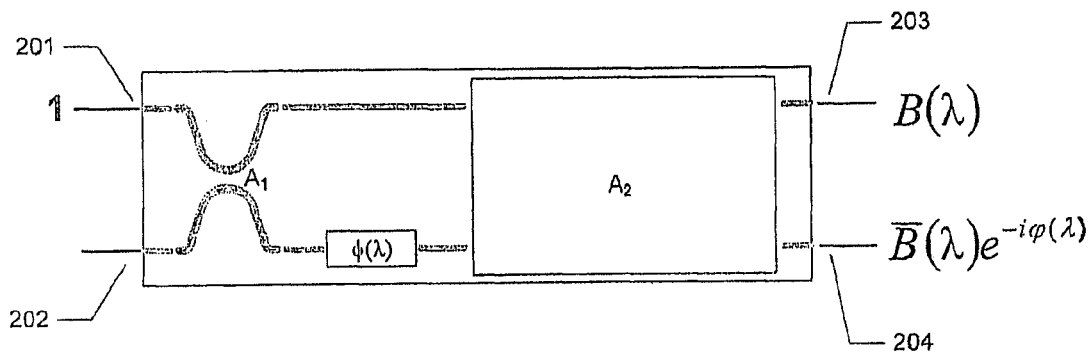

Figure 2

Drawing Sheet 3 of 8 - Figure 6 should be:

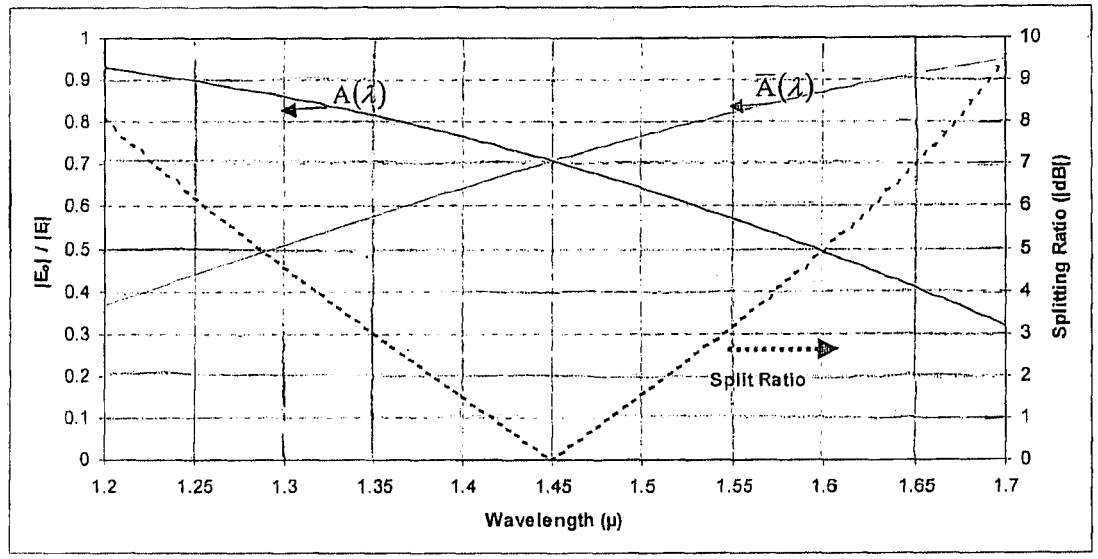

Figure 6

Figure 16:
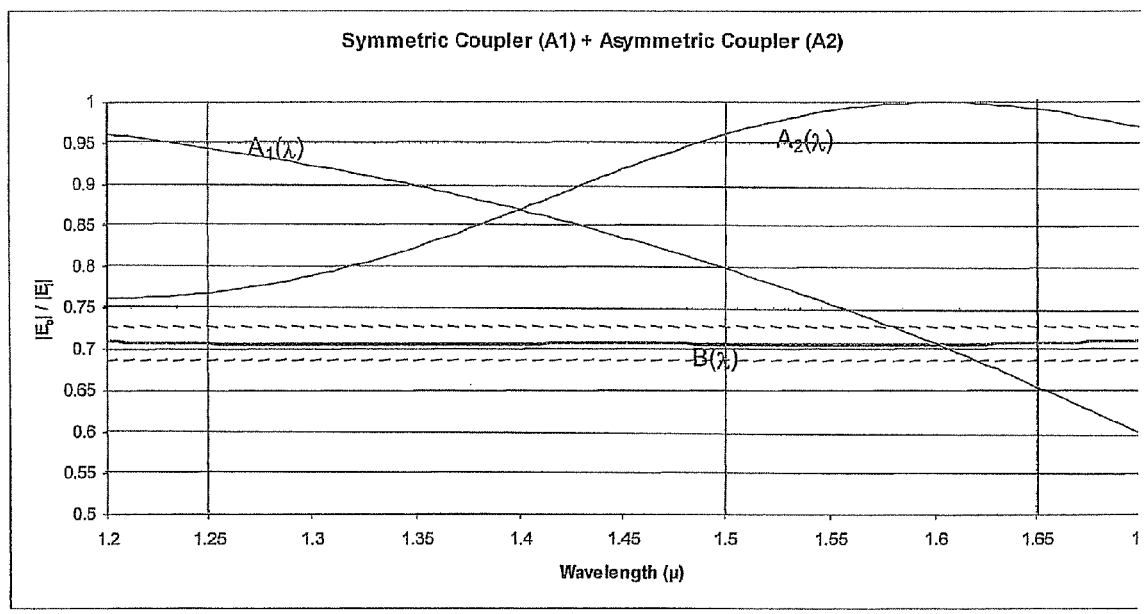
FIG. 16 shows another graph of the device of FIG. 13.
Figure 10:
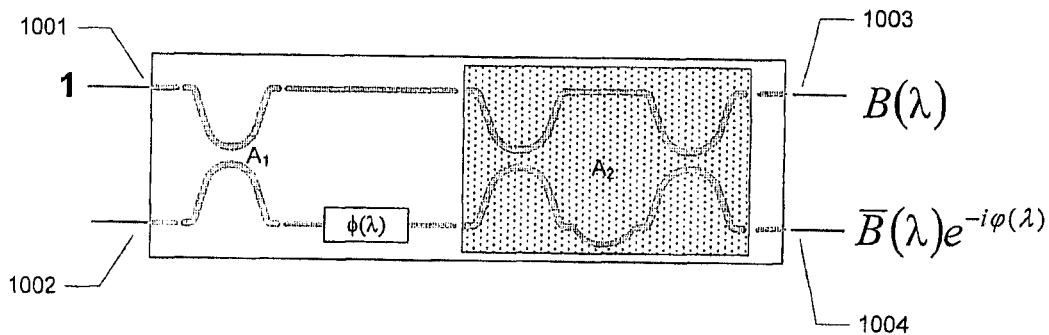
Figure 12:
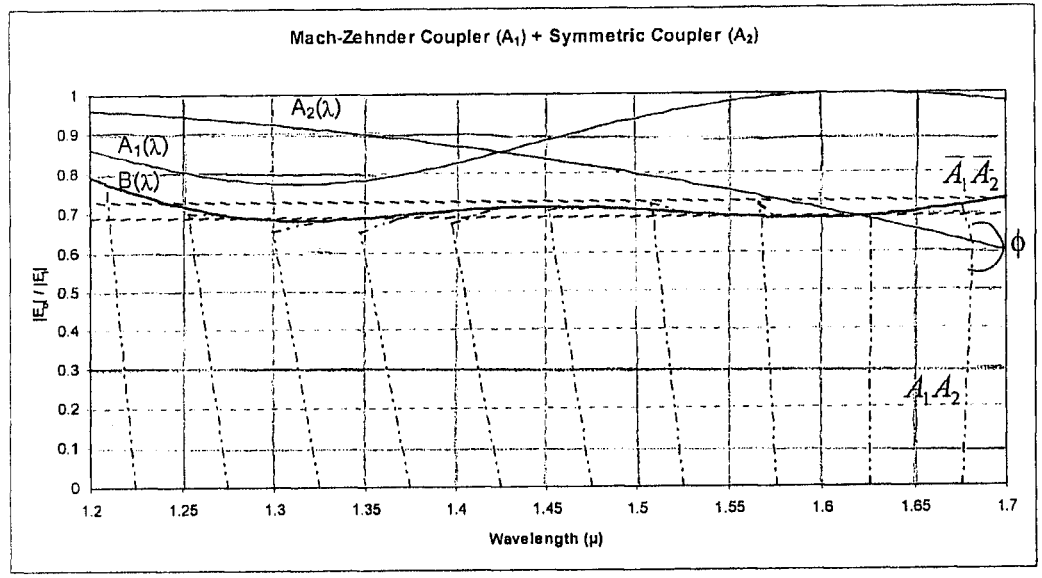
Figure 16:
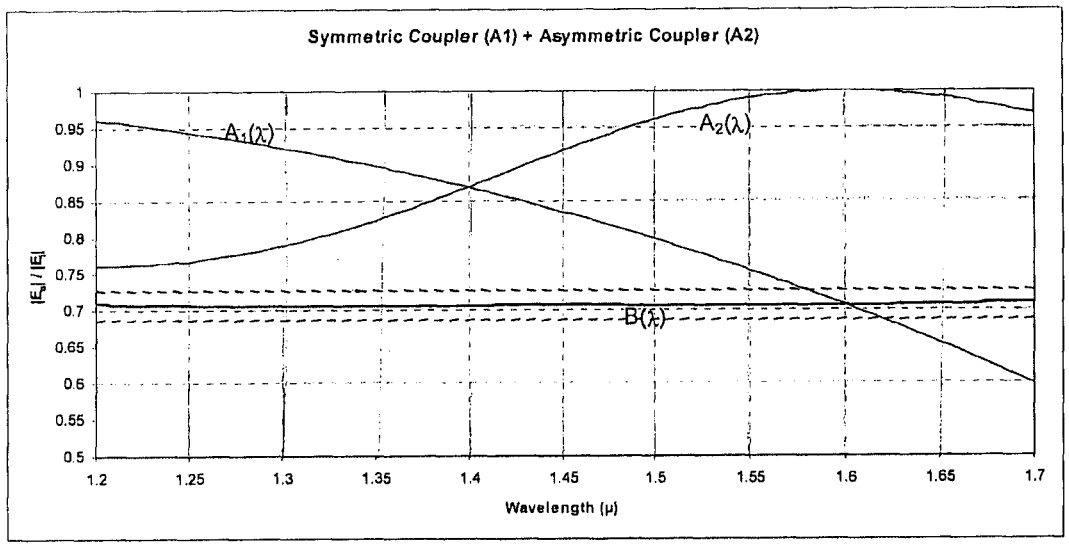

Drawing Sheet 5 of 8 - Figure 10 should be:

Drawing Sheet 6 of 8 - Figure 12 should be:

Drawing Sheet 8 of 8 - Figure 16 should be: